(12) United States Patent
Ichikawa et al.

(10) Patent No.: US 6,442,005 B2
(45) Date of Patent: Aug. 27, 2002

(54) LIGHT DIFFUSION PREVENTING STRUCTURE

(75) Inventors: Tadaoki Ichikawa; Hiroshi Ito; Kazushi Noda, all of Nishikasugai-gun (JP)

(73) Assignee: Toyoda Gosei Co., Ltd., Aichi-ken (JP)

(*) Notice: Subject to any disclaimer, the term of this patent is extended or adjusted under 35 U.S.C. 154(b) by 0 days.

(21) Appl. No.: 09/866,914

(22) Filed: May 30, 2001

(30) Foreign Application Priority Data

May 30, 2000 (JP) .......................... 2000-159348

(51) Int. Cl.[7] .............................................. F21V 11/08
(52) U.S. Cl. ........................ 360/292; 360/290; 360/359; 360/351
(58) Field of Search ................ 362/290, 291, 362/292, 351, 359, 488, 489, 490, 496; 359/599, 601, 611, 613, 1; 313/512; 355/2

(56) References Cited

U.S. PATENT DOCUMENTS 3,677,634 A * 7/1972 Mathisen ........................ 355/2
3,786,261 A * 1/1974 Tucker ........................ 250/205
4,128,324 A * 12/1978 Seeger ........................ 396/324
4,390,243 A * 6/1983 Hammerschlag ............ 359/601

* cited by examiner

*Primary Examiner*—Sandra O'Shea
*Assistant Examiner*—Hargobind S. Sawhney
(74) *Attorney, Agent, or Firm*—Pillsbury Winthrop LLP

(57) ABSTRACT

A light diffusion preventing structure, suitable for use in vehicles, is provided on a structural member having a hole for passing light from a light source through the structural member and onto a target area. The hole has a three-dimensional shape that has a first opening located near the light source and a second opening located on the opposite side with an inner peripheral surface running between. Both the edge of the second opening and the inner peripheral surface are located completely outside a zone defined by projecting imaginary straight lines from the point light source through the first opening. A second set of imaginary straight lines running between the edge the first opening and the opposite edge of the second opening define at least one crossing angle, the measure of which should preferably not exceed 160 degrees.

14 Claims, 3 Drawing Sheets

LIGHT DIFFUSION PREVENTING STRUCTURE

BACKGROUND OF THE INVENTION

1. Field of the Invention

This invention relates to a light diffusion preventing structure, and more particularly to a light diffusion preventing structure used in conducting light from a light source into a enclosed space that is defined by a structure having an interior finished with a structural member, while the light source is located outside of the enclosed space.

2. Description of the Related Art

FIG. 3 depicts a relation between a light source and a conventional structure provided with a hole for allowing the light to pass from the light source through structure. FIG. 4 shows a spatial relationship between a grille used as a conventional structure and a light source for providing a spotlight on a shift lever or gear lever.

In FIGS. 3 and 4, a lamp 20 comprises an incandescent lamp or other light source fitted into a lamp holder 21. The grille 22 is an ornamental panel attached as a part of the interior trim of a vehicle. The grille 22 also includes a hole 23 for allowing the light from lamp 20 to spotlight a shift lever 30.

In the conventional structure, the light from lamp 20 spotlights the shift lever 30 with light having an irradiation angle θ. The direction of the spotlight illumination is determined by the relationship between the light source 20 and the opening that is located at a lower surface and defined by a lower edge of the hole 23 of the grille 22.

However, the light of the lamp 20 irradiates a first thickness surface 23a or an inner peripheral surface of the hole 23 at one side of the grille 22 as well as a second thickness surface 23b or an inner peripheral surface of the hole 22 at the other side of the grille 22. The brightness at the first thickness surface 23a and the second thickness surface 23b is inversely proportional to square of the distance from the lamp 20 to the surfaces 23a, 23b. The surfaces 23a, 23b are located near the lamp 20. Moreover, the first thickness surface 23a is a surface facing the light source or the lamp 20, while the second thickness surface 23b is a surface more parallel to a radiating direction of the light. Consequently, the first thickness surface 23a has an increased brightness when compared with the second thickness surface 23b. As a result, the first thickness surface 23a tends to be brighter than its surroundings. If such light is located at a position in which light from first thickness surface 23a shines directly into the eyes of a driver at a position where the light from the first thickness surface 23a can be reflected by an inside rear view mirror into the eyes of the driver, it may cause the driver to be distracted.

BRIEF SUMMARY OF THE INVENTION

An object of the present invention is to provide a light diffusion preventing structure by which the light passing through a hole is not diffused by the sidewalls of the hole.

According to a first aspect of the invention, there is provided a light diffusion preventing structure comprising a light source and a structural member. The structural member has a hole that passes a light from the light source. The hole has a three-dimensional shape that has a first opening located near the light source and a second opening located away from the light source. Further, the area of the first opening is smaller than the area of the second opening. Indeed, the circumferential edge of the second opening is located completely outside of a zone defined between imaginary straight lines connecting the point light source and the circumferential edge of the first opening provided that the light source is the point light source. This configuration ensures that the imaginary straight lines never touch any of the inner peripheral surface of the structural member between the first and second opening.

According to a second aspect of the invention, there is provided a light diffusion preventing structure comprising a light source and a structural member. The structural member has a hole that allows light from the light source to pass through the member and into an interior space. The hole has a three-dimensional shape that includes a first opening located near the light source and a second opening located away from the light source. The first and second openings are configured so that the area of the first opening is smaller than an area of the second opening. Imaginary straight lines connecting the circumferential edge of the first opening and the opposite circumferential edge of the second opening have a crossing angle of not more than 160 degrees and more preferably not more than 150 degrees.

According to a third aspect of the invention, there is provided a light diffusion preventing structure comprising a light source and a structural member.

The structural member has a hole that allows light from the light source to pass through the member and into an interior space. The hole has a three-dimensional shape that includes a first opening located near the light source and a second opening located away from the light source. The first and second openings are configured so that the area of the first opening is smaller than an area of the second opening. The holes are also configured so that the circumferential edge of the second opening is located outside a zone defined between first imaginary straight lines connecting a point light source and the circumferential edge of the first opening provided that the light source is the point light source. The first imaginary straight lines are never touch any of the inner peripheral surface of the structural member between the first and second opening. Second imaginary straight lines connecting the circumferential edge of the first opening and the opposite circumferential edge of the second opening have a crossing angle of not more than 160 degrees and more preferably not more than 150 degrees.

Further objects and advantages of the invention will be apparent from the following description, reference being had to the accompanying drawings, wherein preferred embodiments of the invention are clearly shown.

DETAILED DESCRIPTION OF THE INVENTION

Figure 2:
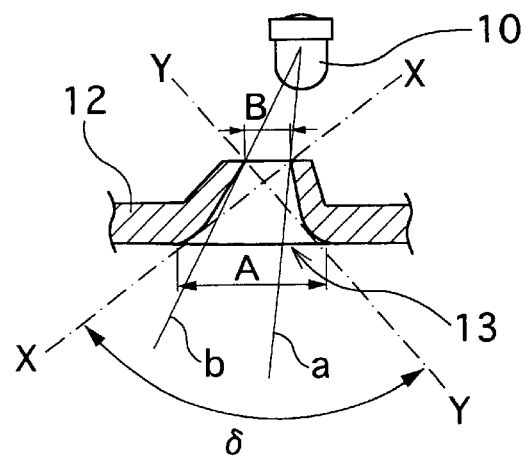
FIG. 2 is an explanatory drawing depicting a basic principle of the light diffusion preventing structure according to the first embodiment of the invention.
Figure 3:
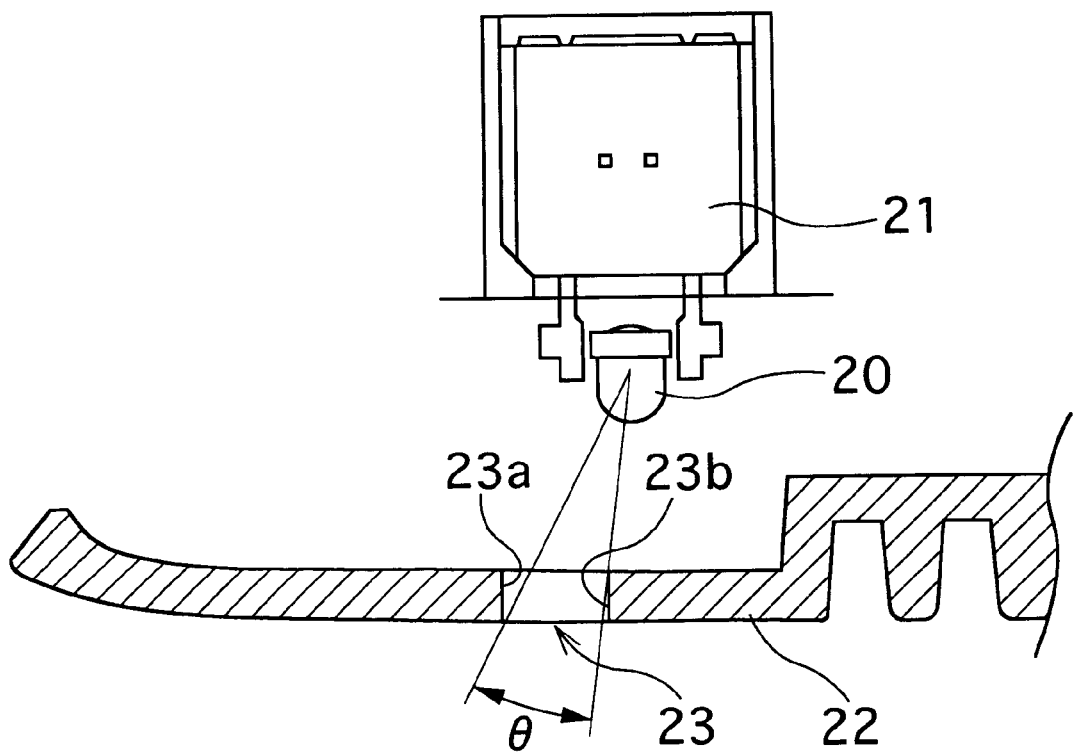
FIG. 3 is an explanatory drawing showing a relation between a light source and a structural member having a hole that permits the light to go through in prior art.
Figure 4:
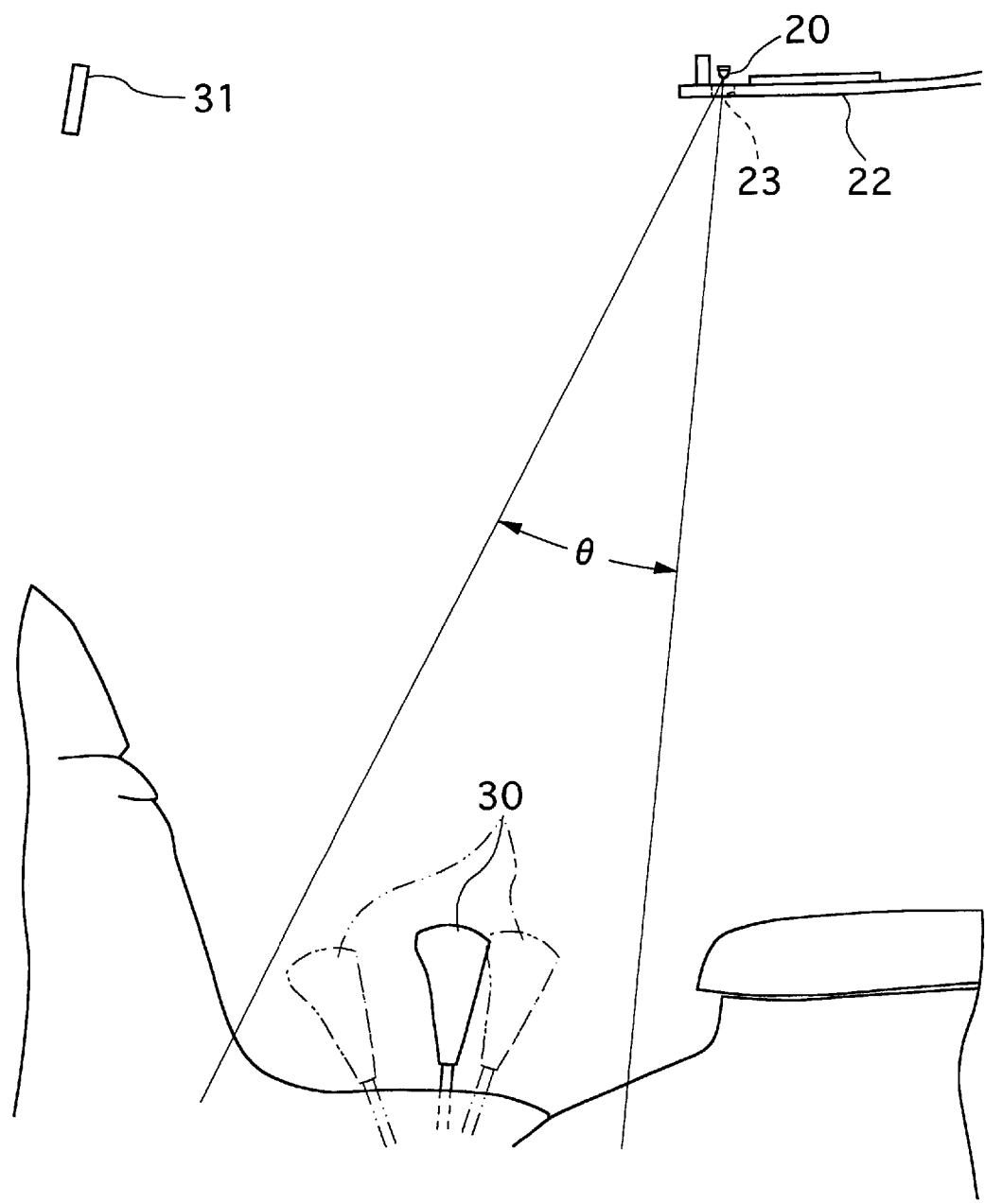
FIG. 4 is an explanatory drawing showing a relationship between the structural member and the light source intended to spotlight a shift lever from an overhead grille in prior art.

Several embodiments of the invention are described below with reference to the attached drawings. The same reference characters are used to identify the corresponding elements in each of the figures with FIGS. 1 and 2 illustrating an embodiment of the invention and FIGS. 3 and 4 showing prior art structures.

Figure 1:
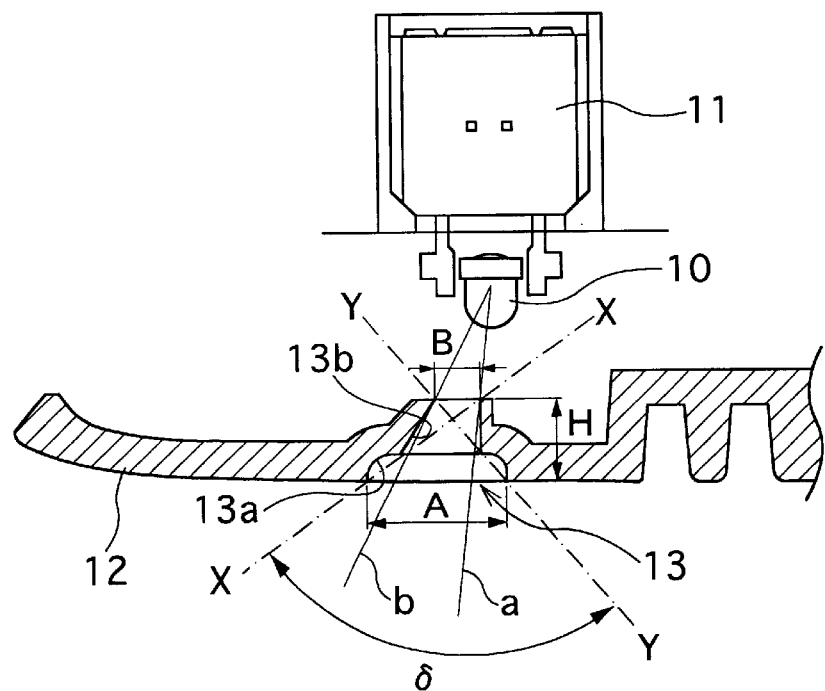
FIG. 1 is an explanatory drawing of a light diffusion preventing structure according to a first embodiment of the invention.

FIG. 1 illustrates a light diffusion preventing structure according to a first embodiment of the invention.

Referring to FIG. 1, a lamp 10 comprising a incandescent lamp, a light emitting diode (LED), a fluorescent lamp or the like is provided as a light source. The light source is not limited to the one that is used for spot illumination. However, as described later, the light diffusion preventing structure according to the present invention is particularly useful for use in conjunction with light sources adapted for spot illumination. The lamp 10 is inserted in a lamp holder 11 that both supplies electric power and positions the lamp. A grille 12 is an ornamental panel mounted for a decoration of an interior of a vehicle and provides an ornamental design for the interior of the vehicle.

The grille 12 has a through hole 13 formed therein. The through hole 13 permits light from lamp 10 to pass through the grille and into the interior of the vehicle. Thus, light passing through hole 13 can illuminate a shift lever (not shown) or the other interior feature as in the prior art.

The through hole 13 includes a stepped hole 13a adjacent the lower (i.e., interior) surface of the grille 12. The stepped hole 13a opens downwardly and includes a shoulder, thereby defining the lower opening at the lower surface of the grille 12. The diameter A of the lower end of through hole 13 (the lower opening of the stepped hole 13a) is larger than a diameter B of the upper opening that is formed by through hole 13 at the upper surface of the grille 12. As illustrated in FIG. 1, the lower opening with the diameter A is defined by the shoulder at the lower side of the through hole 13 in the stepped hole 13a in FIG. 1. However, a stepped hole having a shoulder is not always necessary to produce a light diffusion preventing structure according to the present invention. FIG. 2, for example, shows a modified embodiment without a stepped hole.

In the embodiment illustrated in FIG. 2, the through hole 13 lacks the stepped hole 13a found at the lower surface of the grille 12 as in the embodiment illustrated in FIG. 1. Specifically, the lower end portion of the through hole 13 has a substantially upwardly tapered shape that defines a lower end opening having a larger diameter at the lower surface of the grille 12. The embodiment illustrated in FIG. 2 is similar in other structural elements to the embodiment illustrated in FIG. 1. Given this similarity, the description of the common elements will be addressed with reference to the embodiment illustrated in FIG. 1 but should be understood to apply equally to the embodiment illustrated in FIG. 2.

The through hole has a height H between the lower opening having a diameter A and the upper opening having a diameter B. The height H may be equal to a thickness of the grille 12, but as illustrated, the height H may be larger than the thickness of the adjacent portions of the grille 12. Specifically, an upper part of the through hole 13 is defined by an upwardly protruded portion formed on the upper side of the grille 12 corresponding to the through hole 13. The upper part of the through hole 13 is substantially tapered upwardly so that the lower part of the through hole 13 (stepped hole 13a) is both continuous with the upper part of the through hole 13 but provides a diameter A that is larger than diameter B.

The lower opening with the diameter A and the upper opening with the diameter B of the through hole 13 is formed as follows. Specifically, the through hole 13 is configured with a three-dimensional shape so that the area of the upper opening (diameter A) located near the lamp 10 is smaller than the area of the lower opening (diameter B) located at the other end of the through hole 13. Provided that the lamp 10 is essentially a point light source, if the point light source and the upper opening are connected with imaginary straight lines a and b, the lower opening is located entirely outside of a zone defined between the lines a and b. This means that the front end of the lower opening is located forward of the light projected from lamp 10 through the upper opening as illustrated by the front imaginary line b. Similarly, the back end of the lower opening is located behind the light projected from lamp 10 through the upper opening as illustrated by the back imaginary line a.

Moreover, the three-dimensional shape of the through hole 13 is configured so that lines a and b do not intersect any portion of the inner peripheral surface of the through hole 13.

Although lines a and b intersect the uppermost edge of the upper opening (diameter B), the inner peripheral surface 13b is configured to be at least substantially parallel to lines a and b it is inclined slightly away. With this configuration, the illumination of the inner peripheral surface 13b is very low compared with the illumination of a vertical surface or a surface on which the light is radiated in a perpendicular direction. Thus, even if the driver can directly see a portion of the inner peripheral surface 13b, it is not reflecting sufficient light, i.e., is not bright, and will not distract or annoy the driver. That is, the illumination of the inner peripheral surface 13b never becomes higher than the illumination of the interior of the vehicle. Consequently, there is no light reflection surface (reflected light source) that is highly illuminated on the inner peripheral surface 13b of the through hole 13 or at the lower surface of the grille 13. As a result, no light will be reflected from peripheral surface 13b into the driver's eyes either directly or via an interior rear view mirror. Thus, the driver will not be distracted by such reflected light. Thus, it is possible to obtain a structure that ensures that light passing through the grille 12 is never diffused at the through hole 13.

In the present embodiment, an imaginary straight line X and an imaginary straight line Y are defined by connecting a rear edge and a front edge of the upper opening (diameter B) with a front edge and a rear edge of the lower end opening (diameter A), respectively. A crossing angle θ between the line X and the line Y is set at a predetermined small value. Consequently, when the line a and the line b contact part of the edge of the upper opening, even if the edge part has a rough finished surface (e.g. a fibrous state) and becomes an irregular reflection surface, the reflected light never comes into the view of the driver either directly or via the interior rear view mirror.

Particularly, according to an experiment of the inventors, it has been confirmed that, if the crossing angle δ between the line X and the line Y is 160 degrees or less, there is very small probability that the reflected light will come into the view of the driver either directly or via the interior rear view mirror. Moreover, it has been also confirmed that even if the crossing angle δ between the line X and the line Y is 150 degrees or less, the influence of the reflected light can be almost completely disregarded.

Consequently, if the spotlight is radiated on the shift lever or the like at an irradiation angle θ as shown in the prior art, the direction of the spot illumination is determined solely by the orientation and configuration of the through hole 13 in the grille 12. Then, it is possible to eliminate substantially all diffusion of light by the through hole 13.

Each of the upper opening (diameter B) and the lower opening (diameter A) preferably is formed into a circular shape in the present embodiment. However, it is possible to form them into another shape such as a square shape or a rectangular shape.

While the through hole 13 is formed on the grille 12 in the present embodiment, it may be formed on any structural member comprising an interior ornamental member.

Although a light diffusion preventing structure according to the present invention may satisfy only one of the preferred relations of the lines a and b and the relation of the lines X and Y described above. If both the relations are satisfied, it is possible to increase reliability and improve performance.

The through hole 13 of the structural member is not limited to a simple through hole. It may be partially or completely filled with a transparent material such as glass or a transparent plastic. The term thickness surface of the structural member is used to describe a surface that has a dimensional change in a linear direction from the light source by the thickness thereof or an additional portion that has been worked thereon.

The preferred embodiments described herein are illustrative and not restrictive, the scope of the invention being indicated in the appended claims and all variations which come within the meaning of the claims are intended to be embraced therein.

What is claimed is:

1. A light diffusion preventing structure comprising:
   a light source; and
   a structural member having a hole that passes a light from the light source,
   the hole having a three-dimensional shape that has
     a first opening located near the light source and
     a second opening located away from the light source,
       an area of the first opening being smaller than an area of the second opening,
       a circumferential edge of the second opening being located outside of a zone that is
         defined between imaginary straight lines connecting
           a point light source and
           a circumferential edge of the first opening provided that the light source is the point light source,
         the imaginary straight lines being never touched linearly and planarly with an inner peripheral surface of the structural member at a side of the first opening.

2. A light diffusion preventing structure comprising:
   a light source; and
   a structural member having a hole that passes a light from the light source,
   the hole having a three-dimensional shape that has
     a first opening located near the light source and
     a second opening located away from the light source,
       an area of the first opening being smaller than an area of the second opening,
   imaginary straight lines connecting a circumferential edge the first opening and a circumferential edge of the second opening having a crossing angle of 160 degrees or less.

3. A light diffusion preventing structure according to claim 2, in which the crossing angle of the imaginary straight lines is 150 degrees or less.

4. A light diffusion preventing structure comprising:
   a light source; and
   a structural member having a hole that passes a light from the light source,
   the hole having a three-dimensional shape that has
     a first opening located near the light source and
     a second opening located away from the light source,
       an area of the first opening being smaller than an area of the second opening,
       a circumferential edge of the second opening being located outside of a zone that is defined between first imaginary straight lines connecting a point light source and a circumferential edge of the first opening provided that the light source is the point light source,
       the first imaginary straight lines being never touched linearly and planarly with an inner peripheral surface of the structural member at a side of the first opening,
       second imaginary straight lines connecting a circumferential edge the first opening and a circumferential edge of the second opening having a crossing angle of 160 degrees or less.

5. A light diffusion preventing structure according to claim 4, in which the crossing angle of the second imaginary straight lines is 150 degrees or less.

6. An illumination system for illuminating a target area comprising:
   a light source for emitting a light; and
   a grille below the light source, the grille comprising an essentially opaque material disposed being positioned between the light source and the target area,
   the grille further comprising a passage for allowing the light to pass from the light source, through the grille and onto the target area,
   the passage comprising
     a first opening having a first area in an upper surface of the grille,
     a second opening having a second area, the second area being larger than the first area, in a lower surface of the grille, and
     an inner peripheral surface surrounding the passage and extending through the grille between the first opening and the second opening,
   wherein the light source, first opening, second opening, and inner peripheral surface are configured and arranged to illuminate the target area and to avoid substantial illumination of any portion of the inner peripheral surface.

7. An illumination system for illuminating a target area according to claim 6 further comprising:
   a first edge surrounding and immediately adjacent the first opening;
   a first point and a second point located on the first edge directly opposite one another across a center of the first opening;
   a first projection line originating at the light source, intersecting the first point, and extending completely through the passage without intersecting a portion of the inner peripheral surface; and
   a second projection line originating at the light source, intersecting the second point, and extending completely through the passage without intersecting a portion of the inner peripheral surface.

8. An illumination system for illuminating a target area according to claim 7 further comprising:

a second edge surrounding and immediately adjacent the second opening;

a third point and a fourth point located on the second edge directly opposite one another across a center of the second opening and aligned with the first and second points, the third point being closer to the first point;

a third projection line originating at the first point, extending completely through the passage, and intersecting the fourth point;

a fourth projection line originating at the second point, extending completely through the passage, and intersecting the fourth point;

the third projection line and the fourth projection line forming an intersection within the passage and defining a crossing angle; wherein the crossing angle is 160 degrees or less.

9. An illumination system for illuminating a target area according to claim 6 further comprising:

an illumination zone defined by projecting a series of straight lines from the light source through the first opening, wherein the inner peripheral surface is completely outside the illumination zone.

10. An illumination system for illuminating a target area according to claim 9 wherein:

the first opening is substantially elliptical;

the second opening is substantially elliptical; and the illumination zone is substantially conical.

11. An illumination system for illuminating a target area according to claim 10 wherein:

the first opening is substantially round; and the second opening is substantially round.

12. An illumination system for illuminating a target area according to claim 6, further comprising:

a transparent material, the transparent material being disposed within the passage.

13. An illumination system for illuminating a target area according to claim 12, wherein the transparent material fills a majority of the passage.

14. An illumination system for illuminating a target area according to claim 12, wherein the transparent material is a glass.

* * * * *